United States Patent [19]

Snyder

[11] Patent Number: 4,775,918

[45] Date of Patent: Oct. 4, 1988

[54] MASK SYSTEM FOR RADIOGRAPH LIGHT BOX

[75] Inventor: William F. Snyder, Hilton, N.Y.

[73] Assignee: Eastman Kodak Company, Rochester, N.Y.

[21] Appl. No.: 100,507

[22] Filed: Sep. 24, 1987

[51] Int. Cl.⁴ .............................................. G03B 15/02
[52] U.S. Cl. ........................................ 362/18; 40/361; 355/7; 355/126; 362/281
[58] Field of Search ...................... 40/361; 362/18, 33, 362/97, 278, 281, 290, 354; 355/7, 126

[56] References Cited

U.S. PATENT DOCUMENTS

| 708,770 | 9/1902 | Johnson . | |
|---|---|---|---|
| 1,813,689 | 7/1931 | Weisker . | |
| 1,988,654 | 1/1935 | Haag | 40/132 |
| 4,325,630 | 4/1982 | Kimura et al. | 355/74 |
| 4,510,708 | 4/1985 | Pokrinchak | 40/361 |

OTHER PUBLICATIONS

Japanese Patent Abstract; No. 60-242447, published 12/2/1985.

Primary Examiner—Stephen F. Husar
Attorney, Agent, or Firm—James A. Smith

[57] ABSTRACT

A masking system for masking the viewing area of a radiograph light box comprises a pair of spaced, endless belts disposed in substantially perpendicular relationship. Each of the belts has spaced opaque regions and spaced transparent regions connecting the opaque regions. The belts are supported on rollers and are movable to selectively position portions of the opaque regions into alignment with the edge regions of the image support.

5 Claims, 4 Drawing Sheets

MASK SYSTEM FOR RADIOGRAPH LIGHT BOX

BACKGROUND OF THE INVENTION

1. Field Of The Invention

This invention relates to apparatus for masking images and more specifically to apparatus for masking radiographs.

2. The Prior Art

X-ray film are conventionally viewed or illuminated for scanning by disposing the same against a diffuser plate behind which is located a lighting source. A mask system is commonly used to eliminate excess light around the borders of radiographs that are smaller than the illuminated area of the light box. Various types of mask systems such as plates and belts are disclosed in the prior art. However, such systems are generally complex structurally, require manual operations such as the manual positioning of plates and/or only mask on two sides of a rectangular area.

SUMMARY OF THE INVENTION

In accordance with the present invention apparatus for masking comprises a pair of spaced endless belts disposed in substantial perpendicular relationship adjacent a support for an image bearing medium. Each of the belts has spaced opaque regions and spaced aperture regions connecting the opaque regions. The belts are supported on rollers and are movable to selectively position portions of the opaque regions into alignment with the edge regions of the image support.

DESCRIPTION OF THE DRAWINGS

Other objects and advantages of the invention will become apparent from the following description taken in connection with the accompanying drawings wherein.

DESCRIPTION OF THE PREFERRED EMBODIMENT

Figure 1:
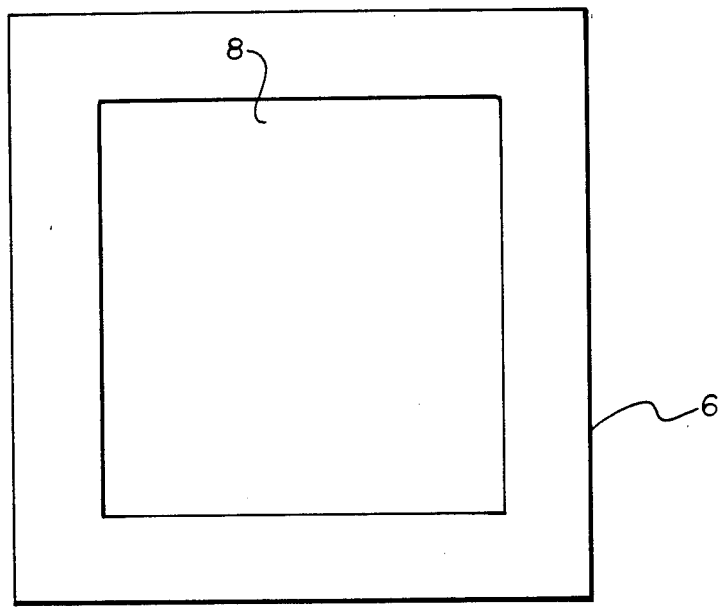
FIG. 1 is a top view of a light box for viewing radiographs.
Figure 2:
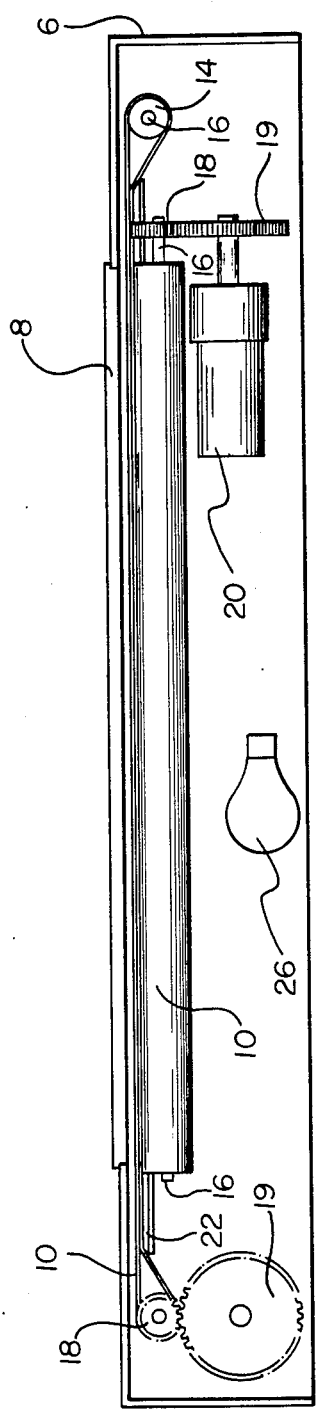
FIG. 2 is a side view of the light box shown in FIG. 1 with one side wall removed.
Figure 3:
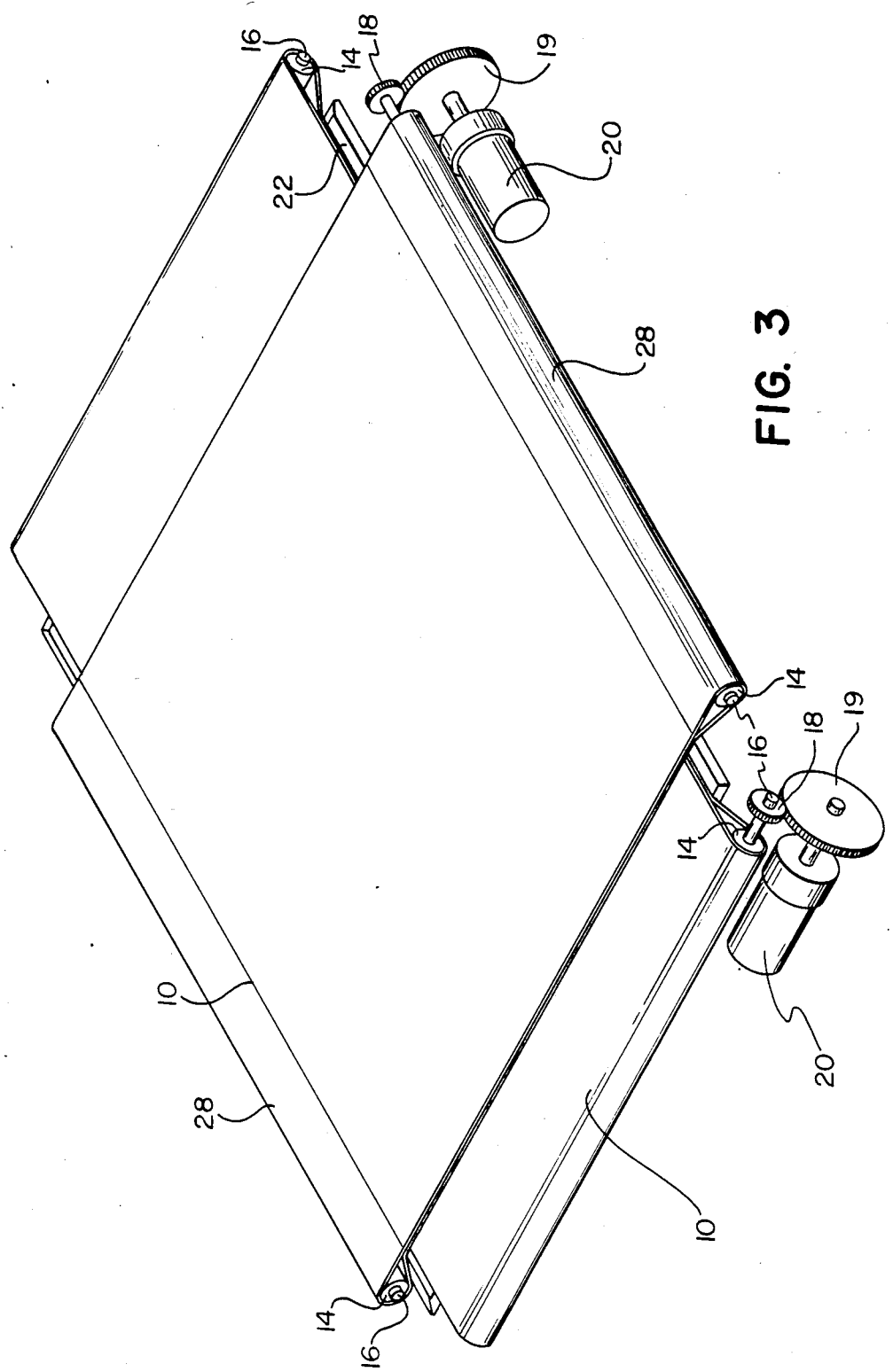
FIG. 3 is a perspective view of the masking system shown in FIG. 1.

Referring to FIGS. 1, 2 and 3 of the drawings, there is shown a light box comprising a housing 6 having a diffuser plate 8 in the upper surface thereof. A masking system in accordance with the invention comprises a pair of endless belts 10, disposed within the housing 6 in substantially perpendicular relationship. As shown in FIG. 3 each of the belts 10 extend around a pair of rotatable rollers 14. Each of the rollers 14 of each pair is rotatably mounted on a suitable supporting frame not shown by means of a shaft 16. One shaft 16 of each roller pair is extended to receive a gear 19 which is engaged by a gear 18 driven by an electric motor 20. The two belts 10 may be moved over their respective rollers 18 by selective energization of their respective motors 20.

The reach portions of each belt extending between their respective rollers are positioned over a transparent support plate 22 corresponding in size to the diffuser 8 and are effectively sandwiched between the support plate 22 and diffuser 8 as shown most clearly in FIG. 2. The support plate 22 thus holds the belts in contact with each other and the belt assembly in contact with the diffuser 8 to render the light transmission through the diffuser, belts and plate as effective as possible.

A light source 26 is positioned below the masking apparatus to illuminate a negative or other transparency placed on the diffuser 24. When so illuminated the image may be viewed, scanned, copied, etc.

Figure 4:
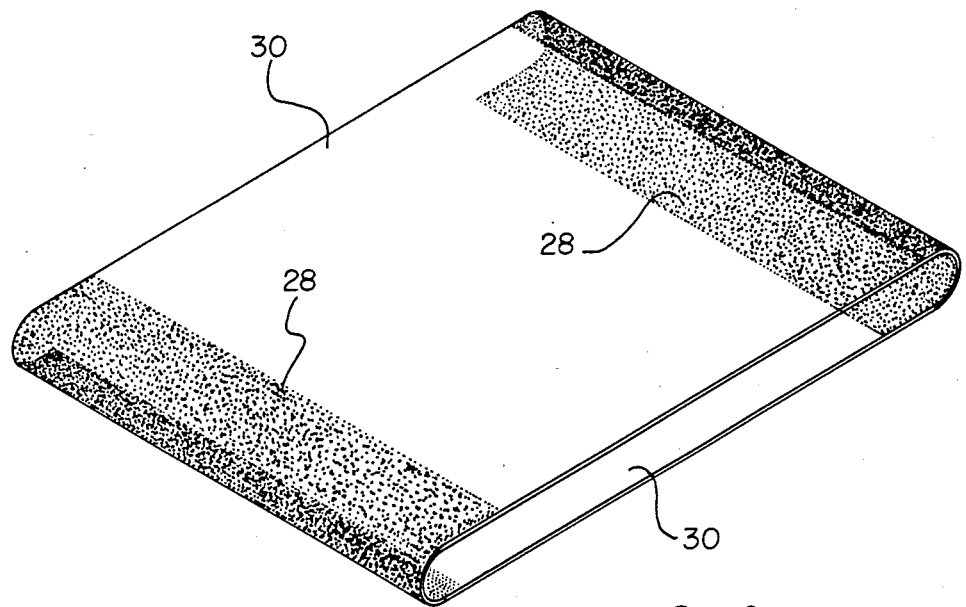
FIG. 4 is an enlarged perspective view of one of the masking belts shown in FIGS. 2 and 3.

Referring now to the specific structure of the belts 10 as shown in detail in FIG. 4, each belt 10 has a width corresponding to the width of the plate 22 and diffuser 8 and is provided with two spaced opaque portions 28 which are connected by transparent or aperture portions 30. Each of the transparent portions 30 has a length corresponding to the length of the plate 22 and diffuser 8.

Figure 5:
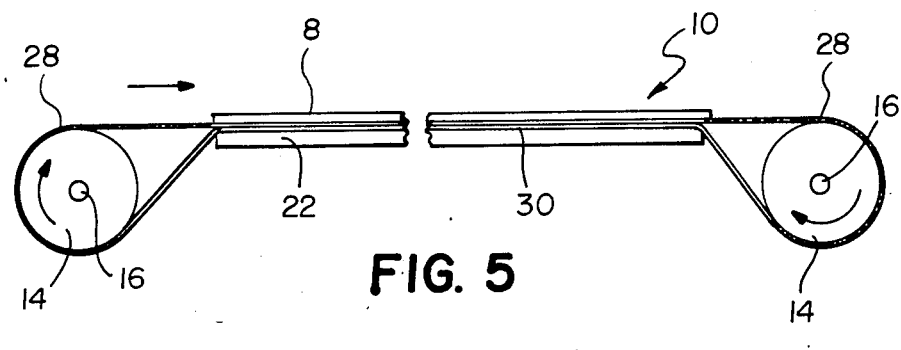
FIG. 5 is a schematic side view showing one of the masking belts in a non-masking position.
Figure 6:
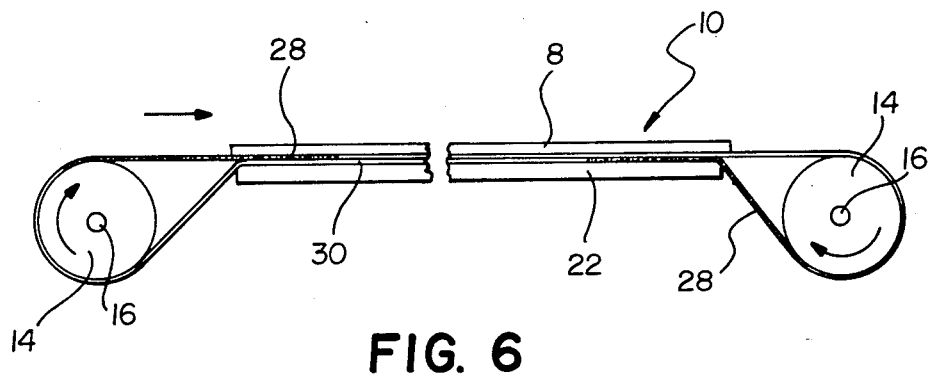
FIG. 6 is a schematic side view similar to FIG. 5 showing one of the belts in a masking position.

When a belt is positioned to align its transparent portions with the diffuser 8, its opaque portions will extend around its respective rollers 14 as shown in FIG. 5. Thus the entire diffuser will be illuminated by the light source 26. However, if the belt 10 is moved as indicated in FIG. 6 to move the opaque sections into the image area the illuminated diffuser area will be effectively masked in either the X or Y direction depending on which belt 10 is moved. By simultaneously moving both belts masking in both the X and Y directions can be accomplished.

Figure 7:
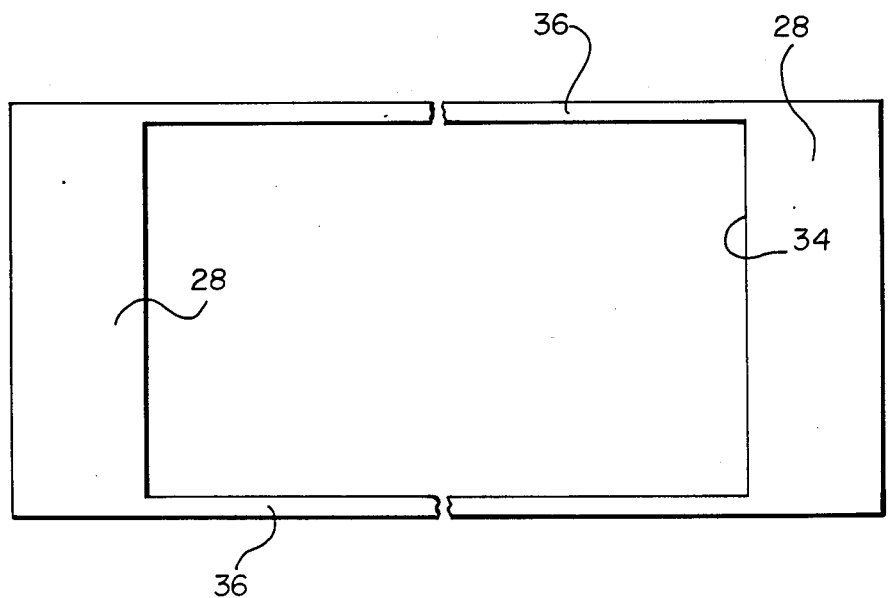
FIG. 7 is a top view of another embodiment of the masking belt.

It will be readily apparent that as an alternative to a belt having continuous material the transparent or aperture sections could comprise cut out areas 34 in an opaque belt as shown in FIG. 7 with narrow edge positions 36 retained to provide belt continuity.

The apparatus disclosed thus provides a simple low cost means for masking a diffuser of a light box to render the light box capable of being used with radiographs of a variety of sizes. Also it will be apparent the masking system is not limited in application to light boxes. For example, it can readily be applied to a photographic printer to mask portions of negatives.

The invention has been described in detail with particular reference to certain embodiments thereof, but it will be understood that variations can be effected within the spirit and scope of the invention as defined in the appended claims.

What is claimed is:

1. Apparatus for masking the edge regions of an area comprising:
    at least one continuous belt having a width corresponding to the width of the area;
    a pair of rotatable rollers positioned at opposite sides of the area respectively for supporting said belt adjacent the area;
    said belt having spaced opaque sections of predetermined length and transparent sections connecting said opaque sections;
    said rollers being movable to move portions of said opaque sections into alignment with opposite edge regions of the area to mask the opposite edge regions.

2. Apparatus for masking the edge regions of an area as claimed in claim 1 further including:

a second continuous belt having opaque and transparent sections substantially identical to the first said belt;

a second pair of rollers positioned at the other opposite sides of the area respectively for supporting said second belt adjacent the area;

said second rollers being movable to move portions of said opaque sections of said second belt into alignment with the other opposite edge regions of the area to mask the other opposite edge regions;

said belts thereby cooperating to mask the entire peripheral edge regions of the area.

3. Apparatus for masking a plate for supporting an image recorded on a medium comprising:

a pair of spaced endless belts disposed adjacent said plate in substantially perpendicular relationship, each of said belts having spaced opaque regions and spaced transparent regions connecting said opaque regions;

roller means for supporting said belts and for positioning said belts to selectively align said transparent regions with said plate and for positioning said belts to align portions of said opaque regions with the peripheral regions of the plate to thereby mask the plate.

4. A light box for illuminating negatives or transparencies differing in size, said box comprising:

a housing a diffuser plate mounted on said housing;

a light source for illuminating said housing;

a pair of endless belts positioned in said housing between said diffuser plate and said light source in substantially perpendicular relationship; each of said belts having spaced opaque regions and spaced transparent regions connecting said opaque regions;

roller means for supporting said belts;

means for rotating said roller means to move said opaque portions into alignment with the edge regions of said diffuser plate to reduce the illuminated area of the diffuser plate.

5. A light box as claimed in claim 4 wherein a transparent supporting plate is positioned below said diffuser plate and wherein the reach portions of said belts are sandwiched between said diffuser plate and said supporting plate.

* * * * *